(12) United States Patent
Tatekawa

(10) Patent No.: US 11,400,867 B2
(45) Date of Patent: Aug. 2, 2022

(54) OPERATION APPARATUS

(71) Applicant: ALPS ALPINE CO., LTD., Tokyo (JP)

(72) Inventor: Tsutomu Tatekawa, Iwaki (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/245,587

(22) Filed: Apr. 30, 2021

(65) Prior Publication Data

US 2021/0380044 A1 Dec. 9, 2021

(30) Foreign Application Priority Data

Jun. 9, 2020 (JP) .............................. JP2020-100243

(51) Int. Cl.
*G06F 3/0488* (2022.01)
*B60R 11/02* (2006.01)
*G06F 3/01* (2006.01)

(52) U.S. Cl.
CPC .......... *B60R 11/0229* (2013.01); *G06F 3/016* (2013.01); *G06F 2203/014* (2013.01)

(58) Field of Classification Search
None
See application file for complete search history.

(56) References Cited

U.S. PATENT DOCUMENTS

| 2016/0098972 | A1* | 4/2016 | Feit ...................... G06T 11/001 345/593 |
| 2016/0373597 | A1* | 12/2016 | An ..................... H04N 1/00488 |
| 2017/0308167 | A1 | 10/2017 | Shibuya et al. |
| 2019/0329652 | A1* | 10/2019 | Sumiya ................ G09G 3/3648 |
| 2020/0031186 | A1 | 9/2020 | Nagasaki et al. |

FOREIGN PATENT DOCUMENTS

| JP | 2017-194886 | 10/2017 |
| WO | 2018/225569 A1 | 12/2018 |

OTHER PUBLICATIONS

Extended European Search Report dated Nov. 4, 2021 in corresponding European Application No. 21174579, 7 pages.

* cited by examiner

*Primary Examiner* — Carl Adams
(74) *Attorney, Agent, or Firm* — Crowell & Moring LLP

(57) ABSTRACT

A unit chassis of an operation unit is fixed to a coupling support portion provided at a support member. A front contact portion is formed at a fixing piece provided at the coupling support portion, and a front restriction portion formed at a right plate portion of the support member and the front contact portion face each other to be spaced apart by a distance in the front-rear direction (Z1-Z2 direction). When the operation unit is pulled toward the near side (Z1 direction), the front contact portion comes into contact with the front restriction portion and restricts a movement of the operation unit.

19 Claims, 12 Drawing Sheets

OPERATION APPARATUS

RELATED APPLICATION

The present application claims priority to Japanese Patent Application Number 2020-100243, filed Jun. 9, 2020, the entirety of which is hereby incorporated by reference.

BACKGROUND

1. Field of the Invention

The present invention relates to an operation apparatus in which an operation unit including an operation detector and a response force application mechanism is supported by a support member with a coupling support portion interposed therebetween.

2. Description of the Related Art

Japanese Unexamined Patent Application Publication No. 2017-194886 discloses an invention relating to an operation apparatus including a feedback mechanism.

The operation apparatus is provided with an apparatus body including a touch sensor on a surface thereof and on which a feedback mechanism is mounted, and the apparatus body is supported at a base with a support metal plate interposed therebetween. A detection member configured to detect that the apparatus body is pressed is provided between the apparatus body and the base. The support metal plate is elastically deformable in both of the direction of action of a feedback force exerted by the feedback mechanism and the direction of a movement in which the apparatus body is pressed.

The operation apparatus is operated through the touch sensor while an image displayed on the apparatus body is reviewed. When the apparatus body is pressed by a finger, the detection member is operated to enable an input operation. In response to an input operation, the feedback mechanism starts. At this time, elastic deformation of the support metal plate can cause the apparatus body to vibrate in a feedback direction and cause the finger that has touched the apparatus body to feel a feedback force.

The apparatus body described in Japanese Unexamined Patent Application Publication No. 2017-194886 includes a panel portion and a housing portion integral with each other and thus has a large mass. Therefore, the apparatus body easily vibrates when being subjected to an external force, such as vehicle-body vibration. Thus, as illustrated in FIG. 2, the apparatus body is installed at an inner portion of an opening portion of an instrument panel such that the inner surface of the opening portion faces the apparatus body with a gap interposed therebetween to thereby enable restriction of the movement of the apparatus body.

However, when the apparatus body is installed at a place other than an opening portion of an instrument panel, it is not possible to restrict the apparatus body by the instrument panel and the like. It is thus required to provide a stopper mechanism that restricts the movement of the apparatus body. The stopper mechanism becomes more complex to restrict the apparatus body from moving in the front-rear, left-right, and up-down directions.

SUMMARY

The present disclosure is to solve the aforementioned problem in the related art, and an object of the present disclosure is to provide an operation apparatus capable of restricting extra movement of an operation unit without providing a complex stopper mechanism.

In addition, an object of the present disclosure is to provide an operation apparatus capable of restricting extra movement of an operation unit in multiple directions without providing a complex stopper mechanism. The present invention is an operation apparatus including: an operation unit including: an operation detector; a support member that supports the operation unit; and a response force application mechanism configured to apply a response force to the operation unit.

The support member is provided with a coupling support portion including an elastic deformation portion, and the operation unit is fixed to the coupling support portion. The support member is provided with a restriction portion facing the coupling support portion with a gap interposed therebetween, and the coupling support portion is configured to restrict a movement of the operation unit by coming into contact with the restriction portion when the elastic deformation portion is deformed in response to an external force acting on the operation unit.

In the operation apparatus according to the present disclosure, the support member is formed of a metal plate, and the coupling support portion is a portion of the support member.

In the operation apparatus according to the present disclosure, the coupling support portion is formed of a metal plate to be a separate body from the support member, and the coupling support portion is fixed to the support member.

In the operation apparatus according to the present disclosure, for example, the coupling support portion is fixed to the support member to be spaced apart by a distance, and a portion of the support member facing the coupling support portion serves as the restriction portion.

In the operation apparatus according to the present disclosure, the coupling support portion is configured to restrict a movement of the operation unit in a direction away from the support member by coming into contact with the restriction portion. In the operation apparatus according to the present disclosure, the restriction portion comprises a plurality of restriction portions, the plurality of restriction portions and the coupling support portion facing each other in a plurality of different directions, and the coupling support portion and the plurality of restriction portions are configured to restrict both of a movement of the operation unit in a direction away from the support member and a movement of the operation unit in directions other than the direction away from the support member by coming into contact with each other.

In the operation apparatus according to the present disclosure, preferably, a recess portion is formed at one of the support member and the coupling support portion, and another one of the support member and the coupling support portion is positioned at an inner portion of the recess portion, thereby constituting the plurality of restriction portions.

In the operation apparatus according to the present disclosure, preferably, the response force application mechanism is configured to apply a response force to the operation unit, and an elastic modulus of the elastic deformation portion in deformation in a direction in which the response force acts thereon is smaller than an elastic modulus thereof in deformation in a direction orthogonal to the direction.

Preferably, the operation apparatus according to the present disclosure further includes a pressure detector configured to detect that the operation unit is pressed toward the support member, and an elastic modulus of the elastic deformation portion in deformation in a direction along a pressed direction is larger than an elastic modulus thereof in deformation in an application direction of a response force.

In the operation apparatus according to the present disclosure, the support member is provided with the coupling support portion including the elastic deformation portion, and the operation unit is supported by the coupling support portion. It is thus possible to move the operation unit in, for example, an acting direction of a response force by the deformation of the elastic deformation portion. Moreover, the support member is provided with the restriction portion configured to restrict a movement of the coupling support portion. It is thus possible to restrict an extra movement of the operation unit without providing a stopper mechanism.

In particular, by disposing the restriction portion to face the coupling support portion on the near side, it is possible to restrict a movement of the operation unit when the operation unit is pulled toward the near side.

DETAILED DESCRIPTION OF THE PREFERRED EMBODIMENTS

First Embodiment

Figure 1:
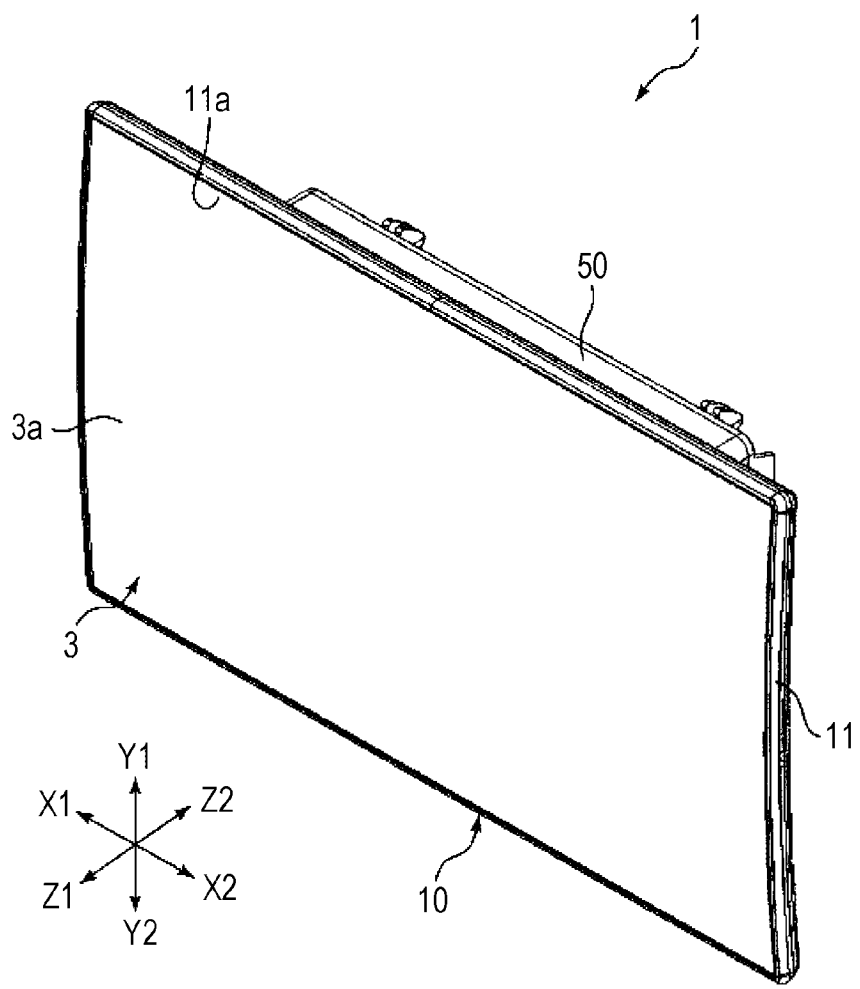
FIG. 1 is a perspective view of an operation apparatus according to a first embodiment of the present invention, as viewed from the near side.
Figure 2:
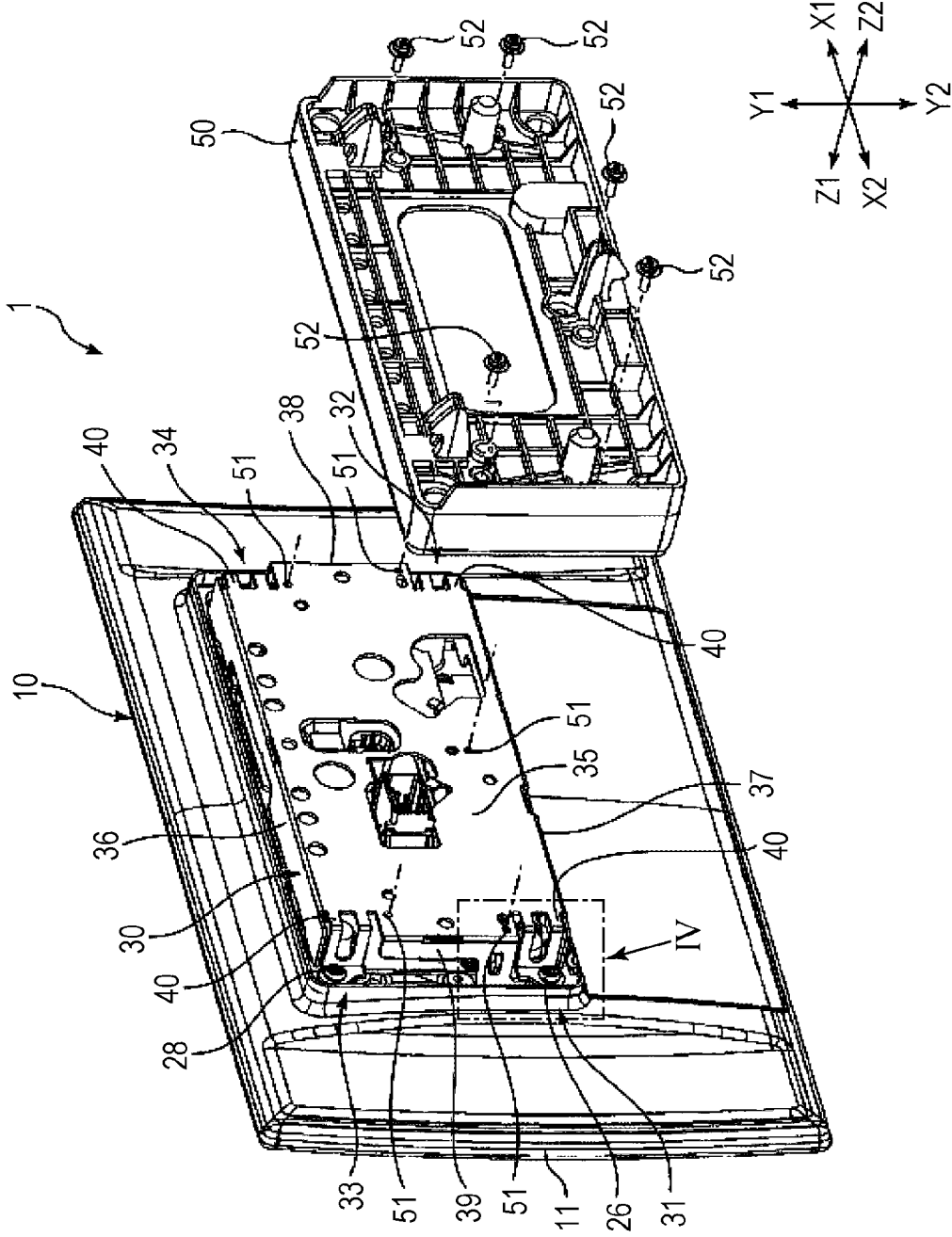
FIG. 2 is an exploded perspective view of the operation apparatus according to the first embodiment of the present invention, as viewed from the rear side.

In FIG. 1 and FIG. 2, an overall structure of an operation apparatus 1 according to a first embodiment of the present invention is illustrated. The operation apparatus 1 is to be used as an on-vehicle display apparatus. The front-rear direction of the operation apparatus 1 is the Z1-Z2 direction. The Z1 direction is the front side and the near side, and the Z2 direction is the rear side. When the operation apparatus 1 is used as an on-vehicle display apparatus, the Z1 direction is directed to the vehicle interior, and the Z2 direction is directed to the traveling direction of the vehicle. The X1-X2 direction is the left-right direction. The X1 direction is the left direction, and the X2 direction is the right direction. The Y1-Y2 direction is the up-down direction, the Y1 direction is the up direction, and the Y2 direction is the down direction.

Figure 3:
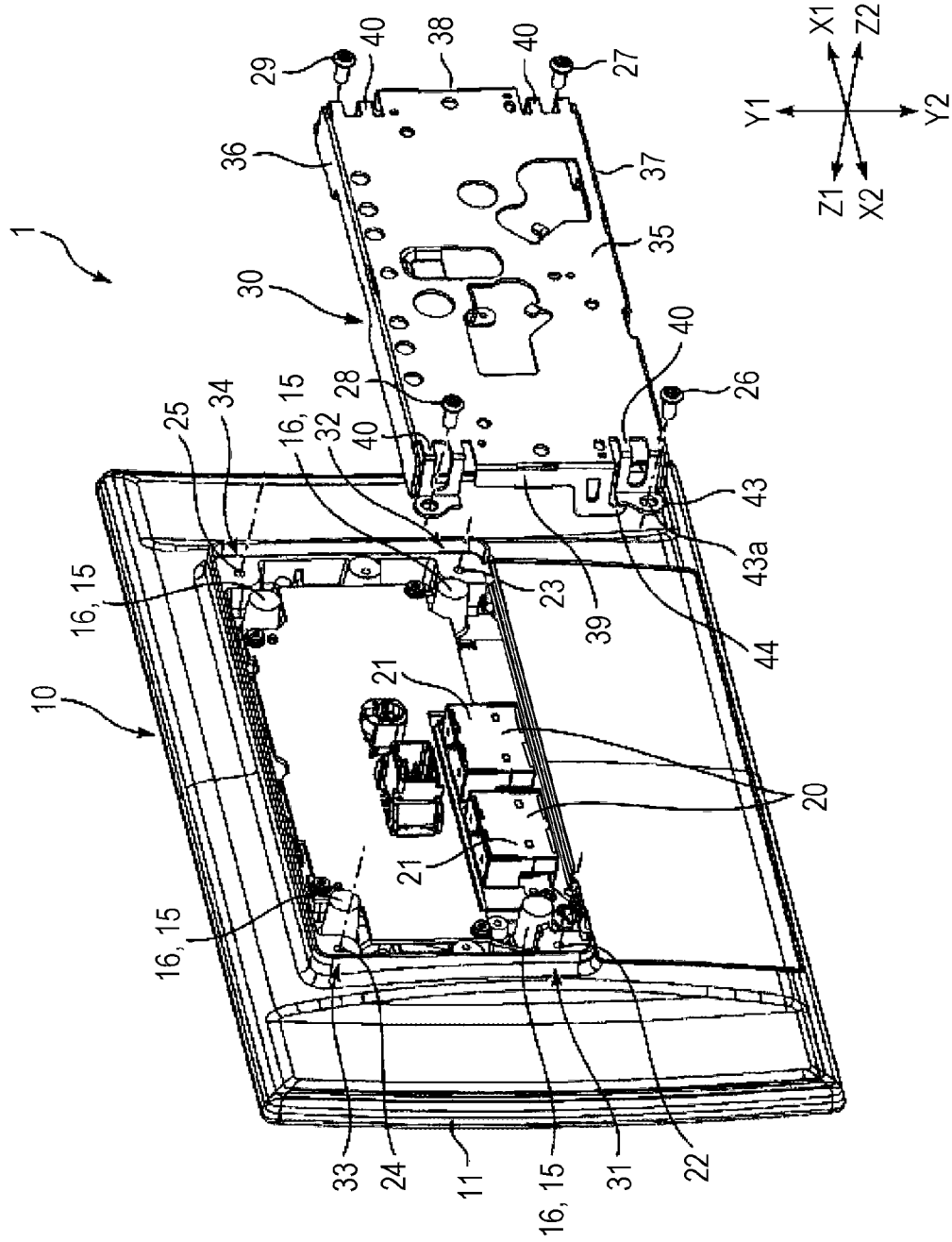
FIG. 3 is an exploded perspective view of the operation apparatus according to the first embodiment of the present invention, as viewed from the rear side.

As illustrated in FIG. 2 and FIG. 3, the operation apparatus 1 includes an operation unit 10 and a support member 30 that supports the operation unit 10 from the rear side (Z2 direction). As further illustrated in FIG. 1 and FIG. 2, a support cover member 50 is fixed to the rear of the support member 30. When the operation apparatus 1 is used as an on-vehicle apparatus, the support member 30 and the support cover member 50 are fixed to a portion of the vehicle body positioned in the inner portion of, for example, an instrument panel, and the operation unit 10 fixed to the support member 30 is installed at a position slightly away from the instrument panel toward the near side (Z1 side), that is, a position floating out toward the inside of the vehicle compartment.

The operation unit 10 includes a unit chassis 11. The unit chassis 11 is formed of a light metal, such as a magnesium alloy or an aluminum alloy by die cast molding. The unit chassis 11 has a cavity portion in the inner portion thereof and, as illustrated in FIG. 1, has an opening portion 11a formed on the near side (Z1 side) to open in a rectangular large area.

A display unit 3 is housed in the inner portion of the unit chassis 11. As illustrated in the sectional views in FIG. 5 and FIG. 6, the display unit 3 is constituted by a plurality of stacked members. In the display unit 3, a transparent cover panel 4 is provided on the nearest side (Z1 side). The cover panel 4 is formed of a glass sheet or a transparent resin material, such as an acrylic resin. The near side surface of the cover panel 4 serves as an operation surface 3a.

An operation detector 5 is bonded to the surface of the cover panel 4 directed to the rear side (Z2 direction). The operation detector 5 is a capacitive touch panel. The operation detector 5 is constituted by a transparent substrate, such as a PET sheet, bonded to the rear surface of the cover panel 4, and a plurality of transparent electrodes provided on a surface of the transparent substrate. When the finger of an operator touches or comes close to the operation surface 3a of the display unit 3, capacitance detected by the transparent electrodes changes. On the basis of the change in distribution of the capacitance at this time, a coordinate location that the finger touches or comes close to is determined.

The operation detector 5 may be a resistance-type sensor panel installed at the near side (Z1 side) surface of the cover panel 4. In the resistance-type sensor panel, a transparent substrate on which a transparent electrode is formed at the entire surface thereof is bonded to a surface of the cover panel 4, a transparent film on which a transparent electrode is formed at the entire surface thereof is stacked on the near side of the transparent substrate, and the near side surface of the transparent film serves as the operation surface 3a. When a portion of the operation surface 3a is pressed, a short circuit occurs between the transparent electrode formed on the transparent film and the transparent electrode formed on the transparent substrate. A change in the resistance value from an electrode portion provided at an edge portion of the transparent electrode to a short circuit portion is detected, and a coordinate location touched by the finger is determined.

Figure 5:
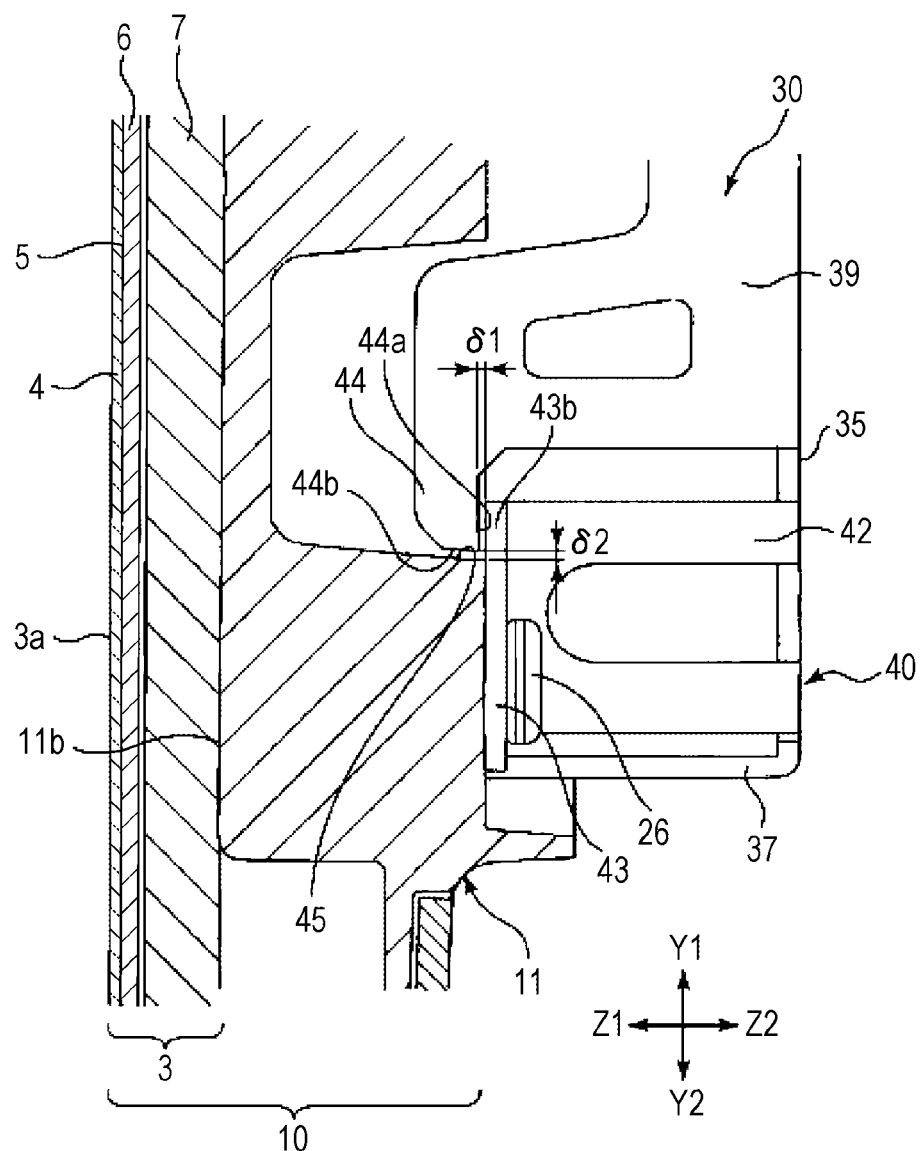
FIG. 5 is an enlarged sectional view taken along line V-V from the enlarged perspective view illustrated in FIG. 4.
Figure 6:
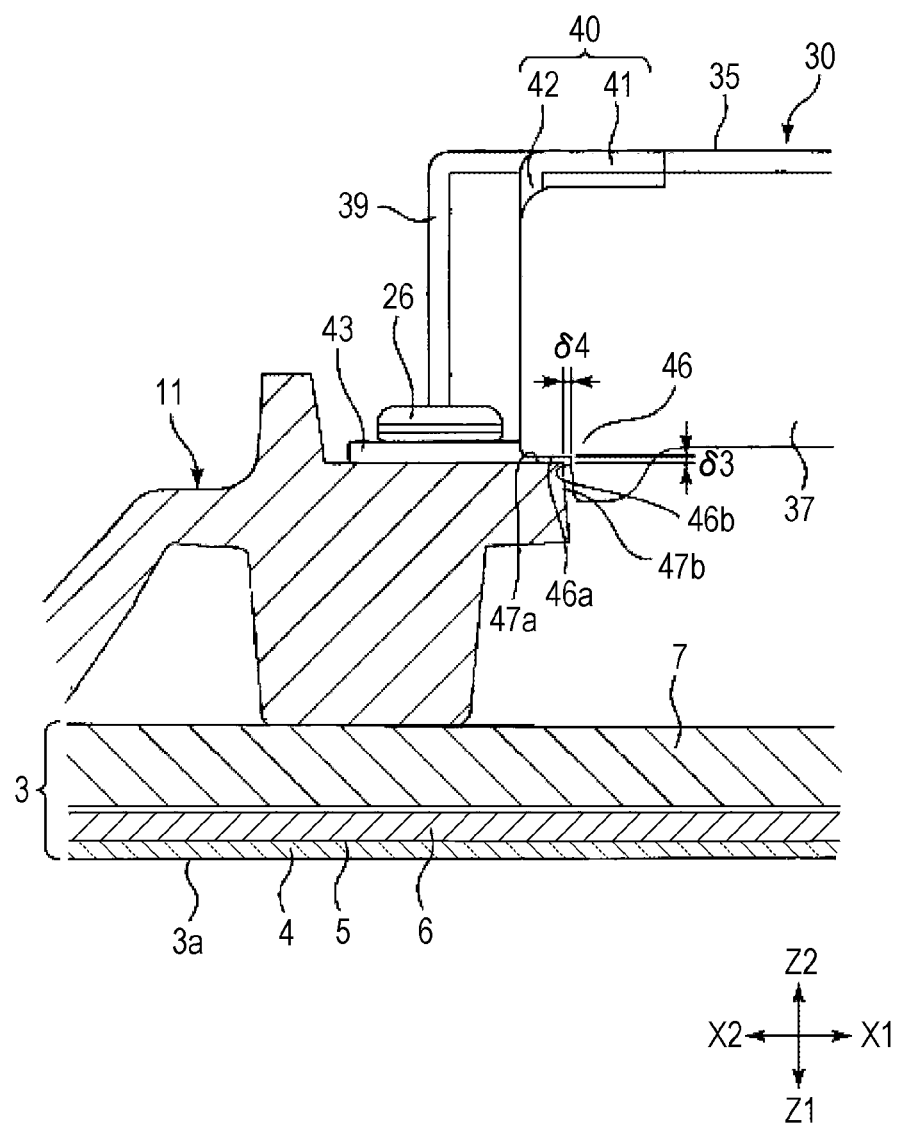
FIG. 6 is an enlarged sectional view taken along line VI-VI from the enlarged perspective view illustrated in FIG. 4.

As illustrated FIG. 5 and FIG. 6, a display cell 6 is bonded to the surface of the display unit 3 directed to the rear side (Z2 direction) of the cover panel 4 with a capacitive operation detector 5 interposed therebetween. The display cell 6 is a translucent color liquid crystal display cell. A backlight device 7 is provided at the rear of the display cell 6. The backlight device 7 includes a case fixed to a fixing surface 11b in the inner portion of the cavity portion of the unit chassis 11, and a light guide member and a light source, such as an LED, are provided in the inner portion thereof. Display light emitted from the backlight device 7 is transmitted through the display cell 6 and the cover panel 4, and an image is displayed using almost the entire surface of the operation surface 3a as a display surface. As a display cell, an electroluminescence display cell is also usable.

In FIG. 3, a state in which the operation unit 10 and the support member 30 are separated from each other is illustrated. Two response force application mechanisms 20 are fixed to the surface of the unit chassis 11, which constitutes the operation unit 10, directed to the rear side (Z2 direction). The response force application mechanisms 20 each include a metal case 21 fixed to the surface of the unit chassis 11 directed to the rear side. In the inner portion of the case 21, a movable yoke made of a magnetic material and having a predetermined mass, and a coil wound around the movable yoke are housed. The movable yoke is supported in the inner portion of the case 21 by a spring member so as to be reciprocable in the left-right direction (X1-X2 direction). A magnet facing the movable yoke is fixed in the inner portion of the case 21.

When the coil is energized, the movable yoke is magnetized, and the polarity thereof changes at a predetermined period. Due to the polarity of the movable yoke and the polarity of the magnet, an attractive force and a repulsive force are alternately act on the movable yoke and vibrate the movable yoke. A reaction force of the vibration of the movable yoke having a predetermined mass is transmitted from the case 21 to the unit chassis 11, and a response force in the left-right direction (X1-X2 direction) is applied to the operation unit 10. The response force can be felt by the finger that touches the operation surface 3a. The direction of the action of the response force applied from the response force application mechanisms 20 to the operation unit 10 is the left-right direction (X1-X2 direction).

As illustrated in FIG. 2, the support member 30 is made of a sheet metal. A circuit board is fixed to the surface of the support member 30 directed to the near side (Z1 side). A pressure detector 15 is provided between the unit chassis 11 and the circuit board. As illustrated in FIG. 3, detection projections 16 constituting one side of the pressure detector 15 are provided at four locations on the surface of the unit chassis 11 directed to the rear side (Z2 direction). The detection projections 16 are integral with the unit chassis 11 and formed of a magnesium alloy or an aluminum alloy. Detection elements constituting the other side of the pressure detector 15 are mounted on the surface of the circuit board directed to the near side (Z1 side). The detection elements are provided at four locations and face the detection projections 16 corresponding thereto. The detection elements are each provided with a detection coil. The detection coils emit an AC magnetic field, and the detection elements detect a change in impedance due to an eddy current loss when the AC magnetic field is applied to the detection projections 16, and measure a change in the distance between the detection projections 16 and the detection elements.

As the pressure detector 15, an optical distance sensor may be used, or a mechanical switch, a piezoelectric element, or the like that is to be pressed by the detection projections 16 may be provided at the support member 30.

Figure 4:
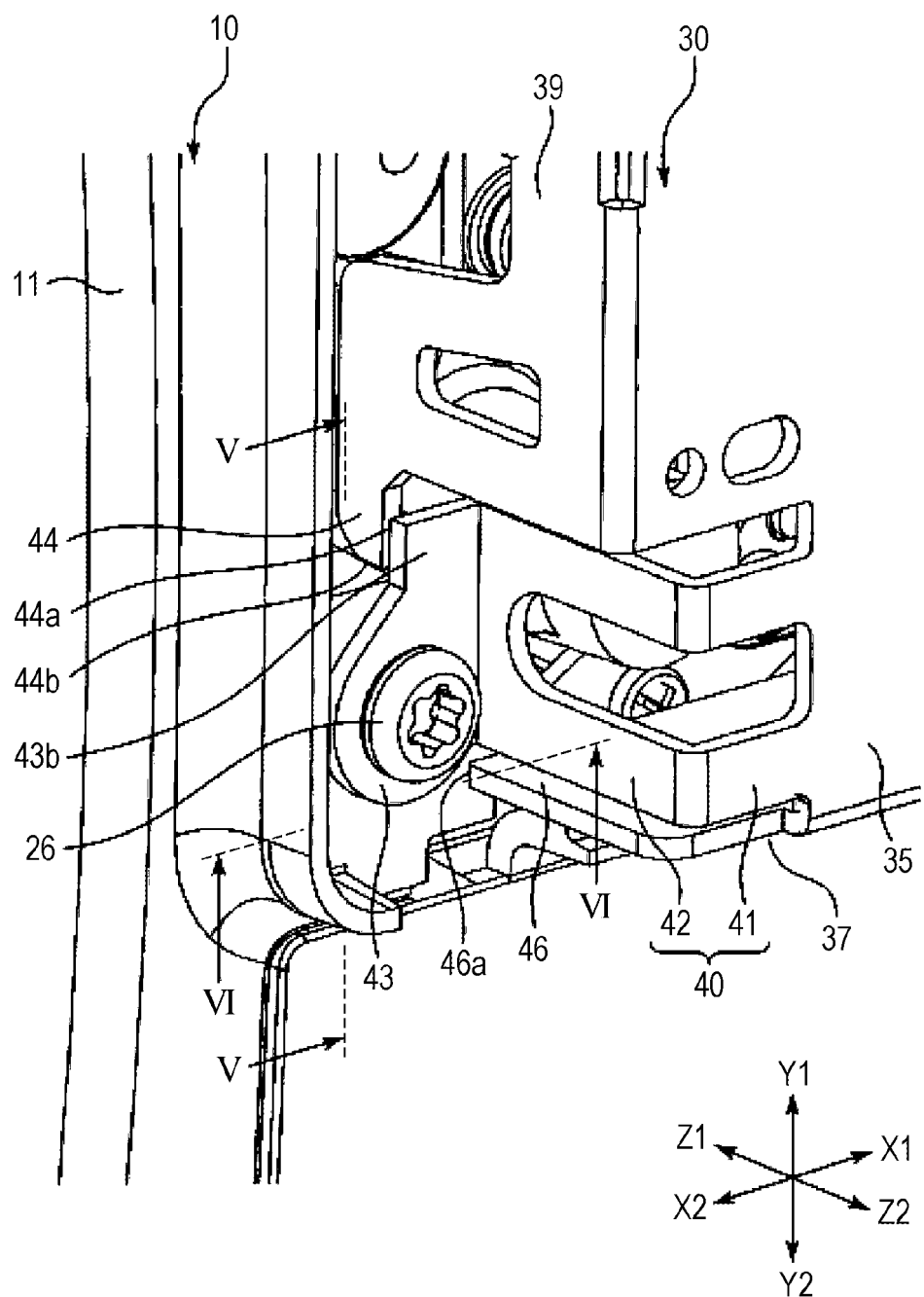
FIG. 4 is an enlarged perspective view of a unit coupling portion at the IV part indicated in FIG. 2.

As illustrated in FIG. 2, the unit chassis 11, which constitutes the operation unit 10, and the support member 30 are coupled to each other by unit coupling portions 31, 32, 33, and 34 at four locations. The unit coupling portion 31 is positioned on the right lower side, the unit coupling portion 32 is positioned on the left lower side, the unit coupling portion 33 is positioned on the right upper side, and the unit coupling portion 34 is positioned on the left upper side. Each of the unit coupling portions 31, 32, 33, and 34 is provided at a location close to the pressure detector 15 having the detection projections 16. In FIG. 4 to FIG. 6, the structure of the unit coupling portion 31 positioned at the IV part on the right lower side is illustrated.

As illustrated in FIG. 2 and FIG. 3, the support member 30 is formed by pressing a sheet metal, such as a rolled steel plate. The support member 30 has a rear plate portion 35 parallel to the X-Y plane. An upper plate portion 36 is integrally bent from the upper side of the rear plate portion 35 toward the near side (Z1 side), and a lower plate portion 37 is integrally bent from the lower side of the rear plate portion 35 toward the near side. Similarly, a left plate portion 38 and a right plate portion 39 are integrally bent from the left side and the right side of the rear plate portion 35, respectively, toward the near side.

The unit coupling portion 31 is provided at a corner portion between the lower plate portion 37 and the right plate portion 39, and the unit coupling portion 32 is provided at a corner portion between the lower plate portion 37 and the left plate portion 38. The unit coupling portion 33 is provided at a corner portion between the upper plate portion 36 and the right plate portion 39, and the unit coupling portion 34 is provided at a corner portion between the upper plate portion 36 and the left plate portion 38.

As illustrated in FIG. 4 to FIG. 6, a coupling support portion 40 is formed integrally with the support member 30 in the unit coupling portion 31. The coupling support portion 40 has a first elastic deformation portion 41 integral with the rear plate portion 35 and extending in the right direction (X2 direction) in parallel with the X-Y plane, and a second elastic deformation portion 42 bent at the right angle from a free end of the first elastic deformation portion 41 on the X2 side toward the near side (Z1 side). In the coupling support portion 40, a fixing piece 43 bent at the right angle in the X2 direction from a free end of the second elastic deformation portion 42 on the Z1 side is integrally formed. As illustrated in FIG. 3, a fixing hole 43a is open in the fixing piece 43.

As illustrated in FIG. 3, female screw holes 22, 23, 24, and 25 are formed at four locations on the surface of the unit chassis 11 directed to the rear side. The female screw holes 22, 23, 24, and 25 are formed at locations close to the detection projections 16 constituting the pressure detector 15.

As illustrated in FIG. 3, in the unit coupling portion 31 on the right lower side, a fixing screw 26 is inserted into the fixing hole 43a opening in the fixing piece 43 at a tip of the coupling support portion 40 and screwed into the female screw hole 22, and the fixing piece 43 is fixed to the unit chassis 11. The coupling support portion 40 is also formed integrally with the support member 30 in each of the other unit coupling portions 32, 33, and 34. In the unit coupling portion 32 on the left lower side, the fixing piece 43 is fixed to the unit chassis 11 by a fixing screw 27. In the unit coupling portion 33 on the right upper side, the fixing piece 43 is fixed to the unit chassis 11 by a fixing screw 28. In the unit coupling portion 34 on the left upper side, the fixing piece 43 is fixed to the unit chassis 11 by a fixing screw 29.

When the support member 30 and the support cover member 50 are fixed to a portion of a vehicle body positioned in the inner portion of, for example, an instrument panel, the operation unit 10 is supported by the coupling support portions 40 at four locations.

With the support member 30 being fixed to a portion of the vehicle body, when an external force in the front-rear direction (Z1-Z2 direction) acts on the operation unit 10, the first elastic deformation portion 41 of the coupling support portion 40 is mainly bent and deformed in the front-rear direction in each of the unit coupling portions 31, 32, 33, and 34. When an external force in the left-right direction (X1-X2 direction) acts on the operation unit 10, the second elastic deformation portion 42 is mainly bent and deformed in the left-right direction.

The elastic modulus (elastic modulus of bending) of each of the coupling support portions 40 when the second elastic deformation portion 42 is bent and deformed in the left-right direction (X1-X2 direction) is smaller than either of the elastic modulus thereof in deformation in the up-down direction (Y1-Y2 direction) and the elastic modulus thereof in deformation in the front-rear direction (Z1-Z2 direction). In other words, the elastic modulus of each of the coupling support portions 40 in deformation in the left-right direction, which is the direction of the action of a response force applied from the response force application mechanisms 20 to the operation unit 10, is smaller than the elastic modulus thereof in deformation in either of the directions orthogonal to the left-right direction.

The elastic modulus of each of the coupling support portions 40 when the first elastic deformation portion 41 is deformed in the front-rear direction (Z1-Z2 direction) is larger than the elastic modulus thereof when the second elastic deformation portion 42 is deformed in the left-right direction (X1-X2 direction). In other words, the elastic modulus of each of the coupling support portions 40 when the operation unit 10 is moved in the front-rear direction is larger than the elastic modulus thereof in deformation in the left-right direction, which is the application direction of a response force.

As illustrated in FIG. 3 and as illustrated in FIG. 4 in an enlarged manner, a restriction piece 44 is integrally formed at a lower side (Y2 side) end portion of the right plate portion 39 of the support member 30. An edge surface of the restriction piece 44 directed to the rear side (Z2 direction) serves as a front restriction portion 44a. A portion of the fixing piece 43 provided at the coupling support portion 40 serves as a front contact portion 43b. As illustrated in FIG. 5, with no external force acting on the operation unit 10, the front restriction portion 44a and the front contact portion 43b face each other to be spaced apart by a distance δ1 in the front-rear direction (Z1-Z2 direction). As illustrated in FIG. 5, the edge surface of the restriction piece 44 directed to the lower side (Y2 direction) serves as an upper restriction portion 44b. In the unit chassis 11, an upper contact portion 45 directed to the upper side (Y1 direction) is formed in the vicinity of the female screw hole 22 into which the fixing screw 26 is screwed. With no external force acting on the operation unit 10, the upper restriction portion 44b and the upper contact portion 45 face each other to be spaced apart by a distance δ2 in the up-down direction (Y1-Y2 direction).

FIG. 6 is a sectional view taken along line VI-VI from FIG. 4. As illustrated in FIG. 6, the right end portion of the lower plate portion 37 of the support member 30 serves as a restriction piece 46. The edge surface of the restriction piece 46 directed to the front side (Z1 direction) serves as a rear restriction portion 46a, and the edge surface of the restriction piece 46 directed to the right direction (X2 direction) serves as a left restriction portion 46b. In the unit chassis 11, a rear contact portion 47a directed to the rear side (Z2 direction) and a left contact portion 47b directed to the left direction (X1 direction) are provided in the vicinity of the female screw hole 22 into which the fixing screw 26 is screwed. The rear restriction portion 46a and the rear contact portion 47a face each other to be spaced apart by a distance δ3 in the front-rear direction (Z1-Z2 direction), and the left restriction portion 46b and the left contact portion 47b face each other to be spaced apart by a distance δ4 in the left-right direction (X1-X2 direction).

The coupling support portion 40 is also integrally formed with the support member 30 in the unit coupling portion 32 provided on the left lower side. In the coupling support portion 40 of the unit coupling portion 32, similarly to the coupling support portion 40 provided at the unit coupling portion 31, the first elastic deformation portion 41 and the second elastic deformation portion 42 are formed continuously, and the fixing piece 43 is bent at a tip portion of the second elastic deformation portion 42. In the unit coupling portion 32, the fixing piece 43 is fixed to the unit chassis 11 by the fixing screw 27.

The unit coupling portion 31 and the unit coupling portion 32 have structures symmetrical in the X1-X2 direction. In other words, the unit coupling portion 31 and the unit coupling portion 32 have structures that are line symmetrical about an imaginary center line extending in the Y1-Y2 direction. In the unit coupling portion 32, a front restriction portion 44a and an upper restriction portion 44b, which are the same as those illustrated in FIG. 4, are provided at a lower part of the left plate portion 38 provided at the support member 30. In the unit coupling portion 32, similarly to those in FIG. 5, the front contact portion 43b and the front restriction portion 44a face each other to be spaced apart by the distance δ1, and the upper restriction portion 44b and the upper contact portion 45 face each other to be spaced apart by the distance δ2. In the unit coupling portion 32, similarly to those in FIG. 6, the rear restriction portion 46a and the rear contact portion 47a face each other to be spaced apart by the distance δ3. Due to the unit coupling portion 31 and the unit coupling portion 32 having the structures that are line symmetrical in the left-right direction, a right restriction portion and a right contact portion, instead of the left restriction portion 46b and the left contact portion 47b in FIG. 6, having structures that are left-right symmetrical to the left restriction portion 46b and the left contact portion 47b in FIG. 6 face each other to be spaced apart by the distance δ4 in the unit coupling portion 32.

In FIG. 2, the coupling support portion 40 is also integrally formed with the support member 30 in each of the unit coupling portion 33 positioned on the right upper side and the unit coupling portion 34 positioned on the left upper side. In the coupling support portion 40 of each of the unit coupling portion 33 and the unit coupling portion 34, the first elastic deformation portion 41 and the second elastic deformation portion 42 are also formed continuously, and the fixing piece 43 is bent at a tip portion of the second elastic deformation portion 42. In the unit coupling portion 33, the fixing piece 43 is fixed to the unit chassis 11 by the fixing screw 28. In the unit coupling portion 34, the fixing piece 43 is fixed to the unit chassis 11 by the fixing screw 29. In the unit coupling portion 33 and the unit coupling portion 34, the front restriction portion 44a, the front contact portion 43b, the upper restriction portion 44b, and the upper contact portion 45 illustrated in FIG. 5 are not provided. The rear restriction portion 46a, the rear contact portion 47a, the left restriction portion 46b, and the left contact portion 47b illustrated in FIG. 6 are also not provided. In addition, the right restriction portion and the right contact portion are also not provided. These restriction portions and the contact portions, however, may be provided in the unit coupling portions 33 and 34.

It is preferable that, in any of the unit coupling portions 31, 32, 33, and 34, a lower restriction portion be provided at a portion of the support member, a lower contact portion be provided at a portion of the unit chassis 11, and the lower restriction portion and the lower contact portion face each other to be spaced apart by a distance in the up-down direction (Y1-Y2 direction).

As illustrated in FIG. 2, the support cover member 50 is fixed to the rear of the support member 30. The support cover member 50 is formed of a light metal material by die cast molding or formed of a hard resin material by injection molding. In the rear plate portion 35 of the support member 30, female screw holes 51 are formed at five locations. With the support cover member 50 being stacked on the rear (Z2 direction) of the support member 30, five fixing screws 52 inserted into the support cover member 50 are screwed into respective female screw holes 51, and the support cover member 50 is thereby fixed to the support member 30. When the operation apparatus 1 is used as an on-vehicle apparatus, the support member 30 and the support cover member 50 are fixed to a portion of a vehicle body positioned in an inner portion of, for example, an instrument panel.

Operation in First Embodiment

Next, an operation of the operation apparatus 1 according to the first embodiment will be described.

As illustrated in FIG. 1, on the side of the unit chassis 11 directed to the near side (Z1 side), the inside of the opening portion 11a is a display screen, and a surface of the cover panel 4 positioned at the opening portion 11a serves as the operation surface 3a. When the display unit 3 in the inner portion of the operation unit 10 is operated, a display image generated by the display unit 3 is displayed on the display screen. When an operator moves a hand near the operation surface 3a or touches the operation surface 3a with a finger and moves the finger while viewing a display image, this is detected by the operation detector 5 provided at the display unit 3 illustrated in FIG. 5, and an operation that, for example, changes the display image is performed.

When the operation unit 10 is pressed toward the rear side (Z2 direction) by the finger touching an image or the like of an operation button displayed on the operation surface 3a, the first elastic deformation portions 41 of the coupling support portions 40 are bent and deformed in the unit coupling portions 31, 32, 33, and 34 at the four locations illustrated in FIG. 2, and the operation unit 10 moves toward the rear side. When the operation unit 10 is pressed toward the rear side, and a facing distance between the detection projections 16 formed at the unit chassis 11 and the detection elements provided at the support member 30 decreases by a predetermined value, the pressure detector 15 detects that the operation unit 10 is pressed and operated. The predetermined value is set to be shorter than a facing distance δ3 between the rear restriction portion 46a and the rear contact portion 47a illustrated in FIG. 6.

When a detection output from the pressure detector 15 is obtained by a controller (not illustrated), a drive signal is given to the response force application mechanisms 20 illustrated in FIG. 3, and the response force application mechanisms 20 are operated. When the response force application mechanisms 20 are operated, a response force in the left-right direction (X1-X2 direction) is applied to the operation unit 10. In each of the unit coupling portions 31, 32, 33, and 34 illustrated in FIG. 2, the second elastic deformation portion 42 of the coupling support portion 40 illustrated in FIG. 4 is bent and deformed, and the movement of the operation unit 10 in the left-right direction is allowed. The left and right vibrations of the operation unit 10 can cause the finger of an operator touching the operation surface 3a to feel the response force.

The elastic modulus of the coupling support portions 40 in deformation in the left-right direction (X1-X2 direction) is smaller than the elastic modulus thereof in deformation in the up-down direction (Y1-Y2 direction). Therefore, when the response force application mechanisms 20 are operated, the operation unit 10 easily moves in the left-right direction, and a response force having a large amplitude can be felt by the finger touching the operation surface 3a. The length dimension of the first elastic deformation portions 41 in the left-right direction (X1-X2 direction) is shorter than the length dimension of the second elastic deformation portion 42 in the front-rear direction (Z1-Z2 direction). Thus, the elastic modulus of the coupling support portions 40 in deformation in the front-rear direction (Z1-Z2 direction) is larger than the elastic modulus thereof in deformation in the left-right direction (X1-X2 direction). Therefore, when the finger touching the operation surface 3a presses the operation unit 10 toward the rear side (Z2 direction), the finger can feel a sufficient pressing resistance force.

As illustrated in FIG. 6, the left restriction portion 46b provided at the support member 30 and the left contact portion 47b, which is a portion of the unit chassis 11, face each other to be spaced apart by the distance δ4. In the unit coupling portion 32 at the left lower portion, a right restriction portion and a right contact portion face each other to be spaced apart by the distance δ4. The distance δ4 is larger than the amplitude in the left-right direction applied to the operation unit 10 by the driving force of the response force application mechanisms 20. Thus, when the operation unit 10 is driven in the left-right direction by the response force application mechanisms 20, the left restriction portion 46b and the left contact portion 47b do not come into contact with each other, and the right restriction portion and the right contact portion do not come into contact with each other.

The operation apparatus 1 is installed at an orientation in which the operation unit 10 slightly floats out toward the near side (Z1 side) from an instrument panel or the like with the support member 30 and the support cover member 50 fixed to a portion of a vehicle. Therefore, there is a likelihood of a large external force in the near direction (Z1 direction), that is, a direction away from the support member 30 acting on the operation unit 10 as a result of, for example, the operation unit 10 being pulled unintentionally by the hand toward the near side (Z1 side). At this time, as illustrated in FIG. 5, the front contact portion 43b integral with the fixing piece 43 of the support member 30 comes into contact with the front restriction portion 44a formed at the right plate portion 39 in each of the unit coupling portion 31 and the unit coupling portion 32. Consequently, the movement of the operation unit 10 toward the near side is restricted, and the coupling support portions 40 can be suppressed from being excessively deformed and plastically deformed.

When a large force directed to the rear side (Z2 direction) acts on the operation unit 10 as a result of, for example, the operation unit 10 being pressed, the rear contact portion 47a, which is a portion of the unit chassis 11, illustrated in FIG. 6 comes into contact with the rear restriction portion 46a, which is a portion of the support member 30, and can restrict the movement of the operation unit 10. When a large force directed to the left direction (X1 direction) acts on the operation unit 10, the left contact portion 47b illustrated in FIG. 6 comes into contact with the left restriction portion 46b and can restrict the movement of the operation unit 10. In the unit coupling portion 32 on the left lower side, the movement of the operation unit 10 in the right direction (X2 direction) can be restricted by contact between the right restriction portion and the right contact portion, which have a structure symmetrical to that in the unit coupling portion 31. Further, in any of the unit coupling portions 31, 32, 33, and 34, when the support member 30 is provided with a lower restriction portion, and the unit chassis 11 is provided with a lower contact portion, the movement of the operation unit 10 in the down direction (Y2 direction) can be restricted.

As illustrated in FIG. 4 and FIG. 5, the front contact portion 43b and the front restriction portion 44a are formed at the same support member 30 in the operation apparatus 1 according to the first embodiment. Thus, it is not necessary to provide the front restriction portion 44a as a separate member from the support member 30, which can reduce the number of components. In addition, work of positioning and fixing the front restriction portion 44a with respect to the unit chassis 11 is not necessary to be performed independently from work of fixing the support member 30, which can reduce the number of assembly steps. Moreover, it is possible to precisely set the facing distance δ1 between the front restriction portion 44a and the front contact portion 43b.

Second Embodiment

Figure 7:
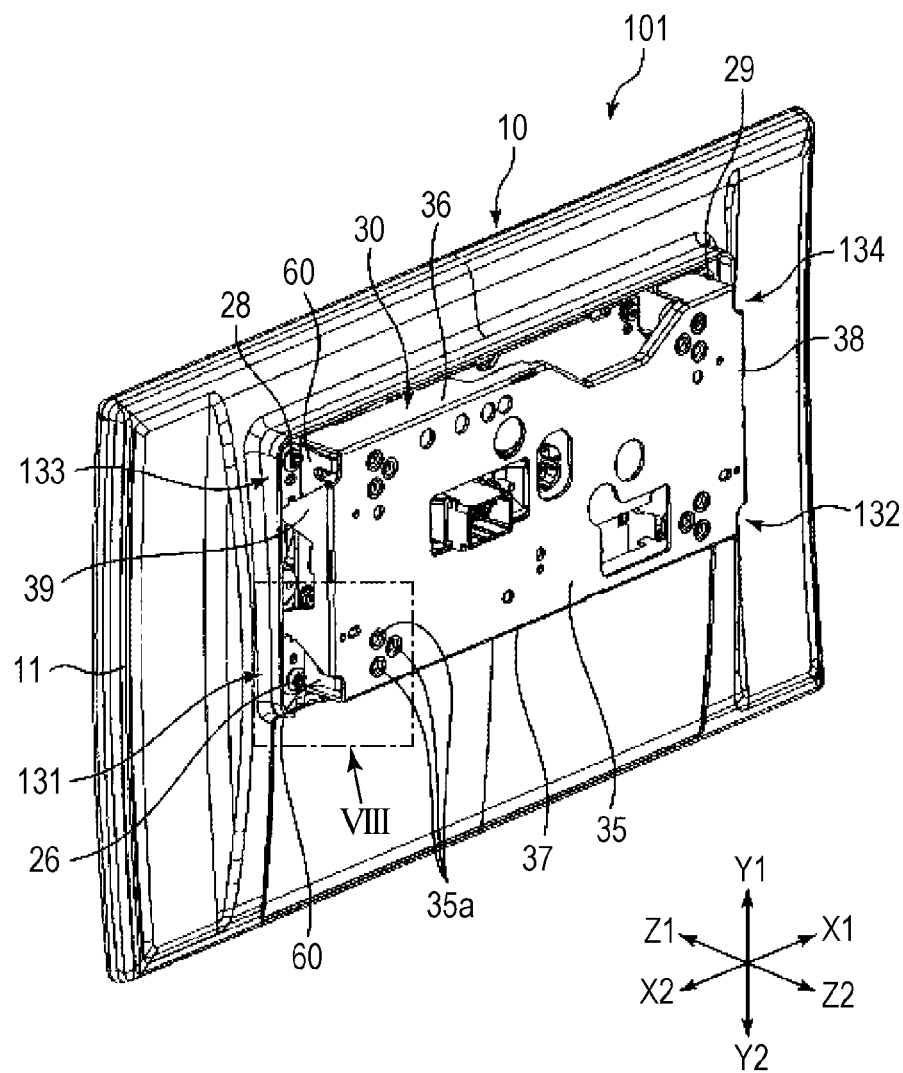
FIG. 7 is a perspective view of an operation apparatus according to a second embodiment of the present invention, as viewed from the rear side.

FIG. 7 is a perspective view of an operation apparatus 101 according to a second embodiment of the present invention, as viewed from the rear side. FIG. 7 corresponds to a diagram in which illustration of the support cover member 50 is omitted in the perspective view of the first embodiment illustrated in FIG. 2.

Figure 9:
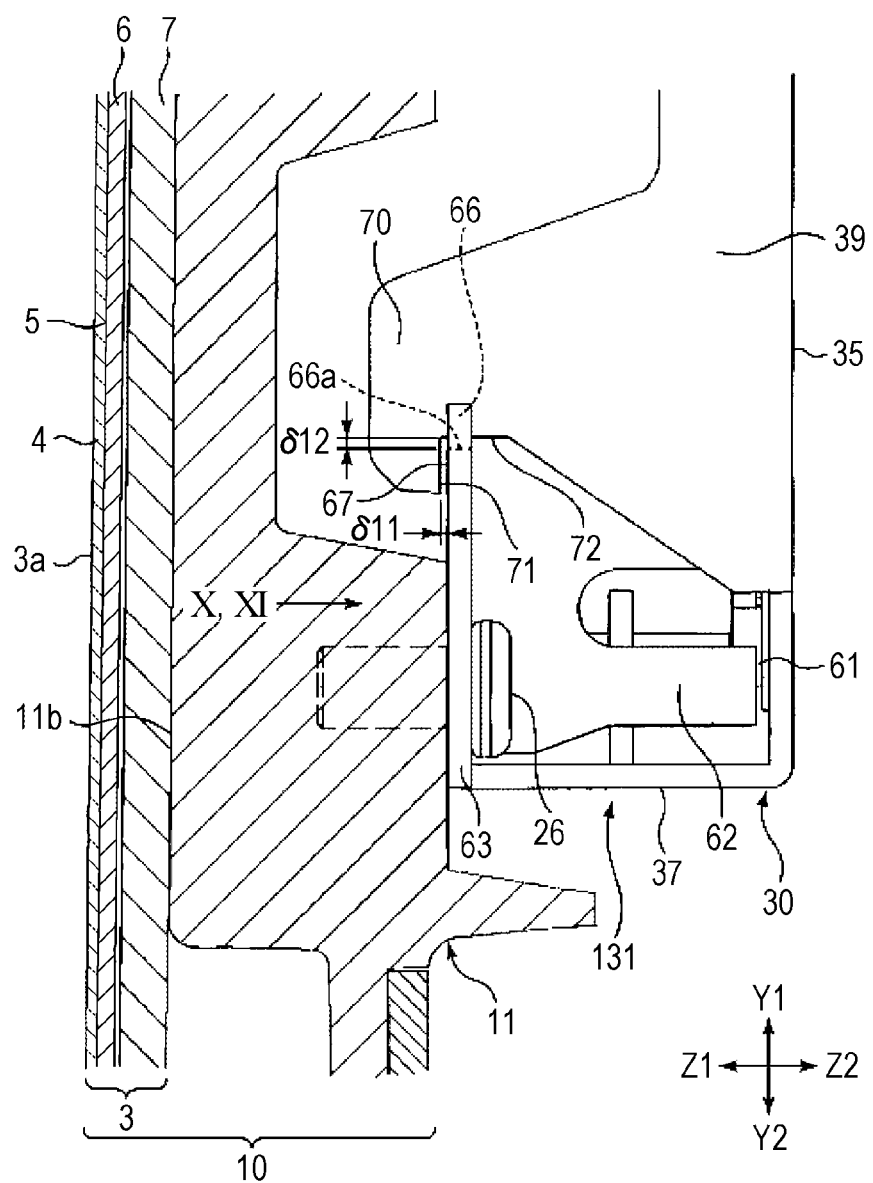
FIG. 9 is an enlarged sectional view taken along line IX-IX from the enlarged perspective view illustrated in FIG. 8.

The operation unit 10 illustrated in FIG. 7 is the same as that of the first embodiment illustrated in FIG. 1, FIG. 2, and the like. The operation unit 10 includes a unit chassis 11 formed by die cast molding. The display unit 3 is housed in the operation unit 10, and a sectional structure thereof is illustrated in FIG. 9. As with the first embodiment illustrated in FIG. 3, the response force application mechanisms 20 configured to apply a response force in the left-right direction (X1-X2 direction) are also mounted on the operation unit 10 in FIG. 7. Similarly to that in FIG. 3, the detection projections 16 are integrally formed at four locations at the unit chassis 11, and the pressure detector 15 is constituted by detection elements mounted on the circuit board of the support member 30 and the detection projections 16.

The support member 30 illustrated in FIG. 7 is formed of a rolled steel plate and includes the rear plate portion 35, the upper plate portion 36, the lower plate portion 37, the left plate portion 38, and the right plate portion 39. The unit chassis 11 and the support member 30 are coupled to each other in each of unit coupling portions 131, 132, 133, and 134. The unit coupling portion 131 is positioned at the right lower-side corner portion of the support member 30, and the unit coupling portion 132 is positioned at the left lower-side corner portion of the support member 30. The unit coupling portion 133 is positioned at the right upper-side corner portion of the support member 30, and the unit coupling portion 134 is positioned at the left upper-side corner portion of the support member 30.

Figure 8:
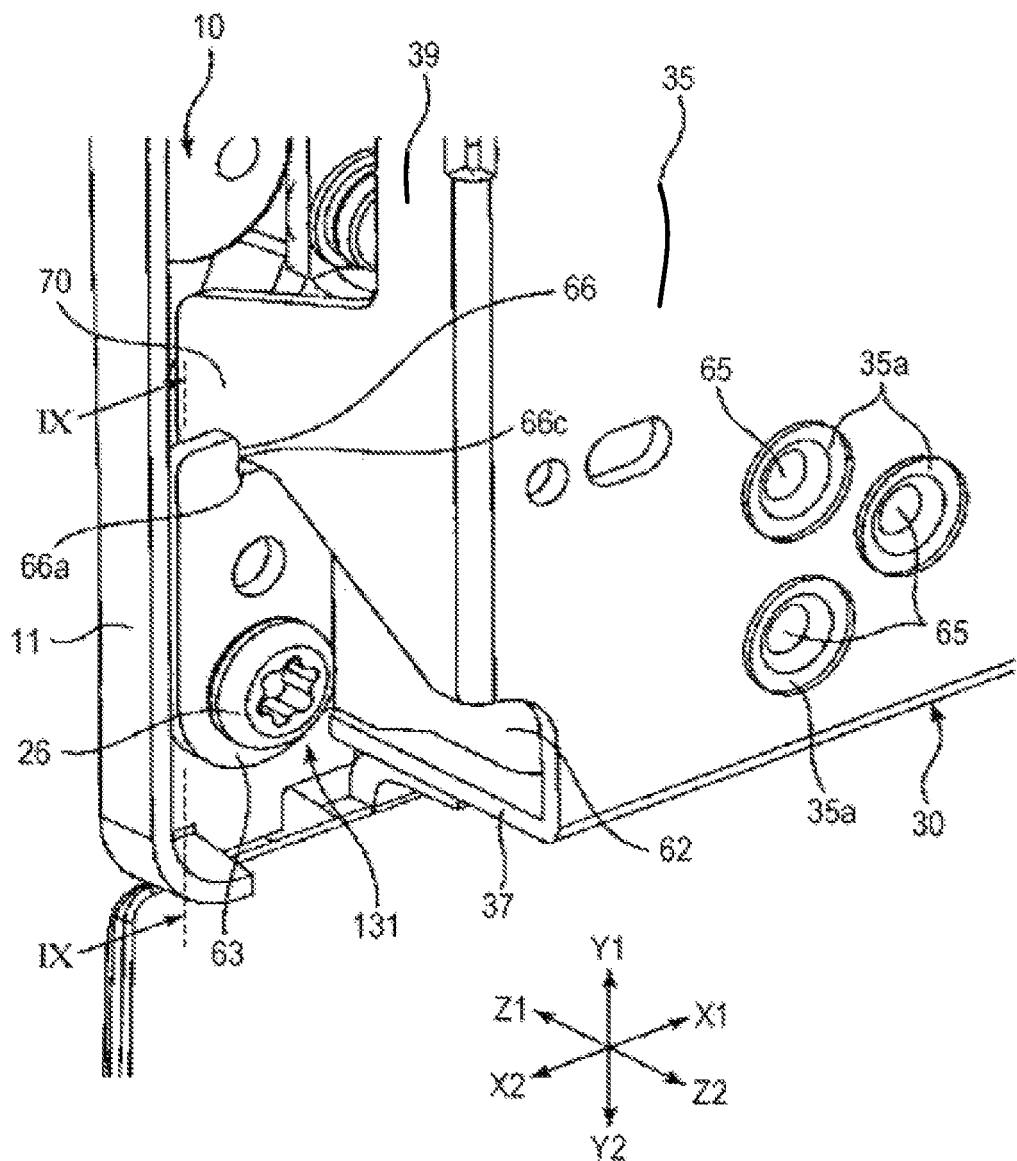
FIG. 8 is an enlarged perspective view of a unit coupling portion in the VIII part indicated in FIG. 7.
Figure 10:
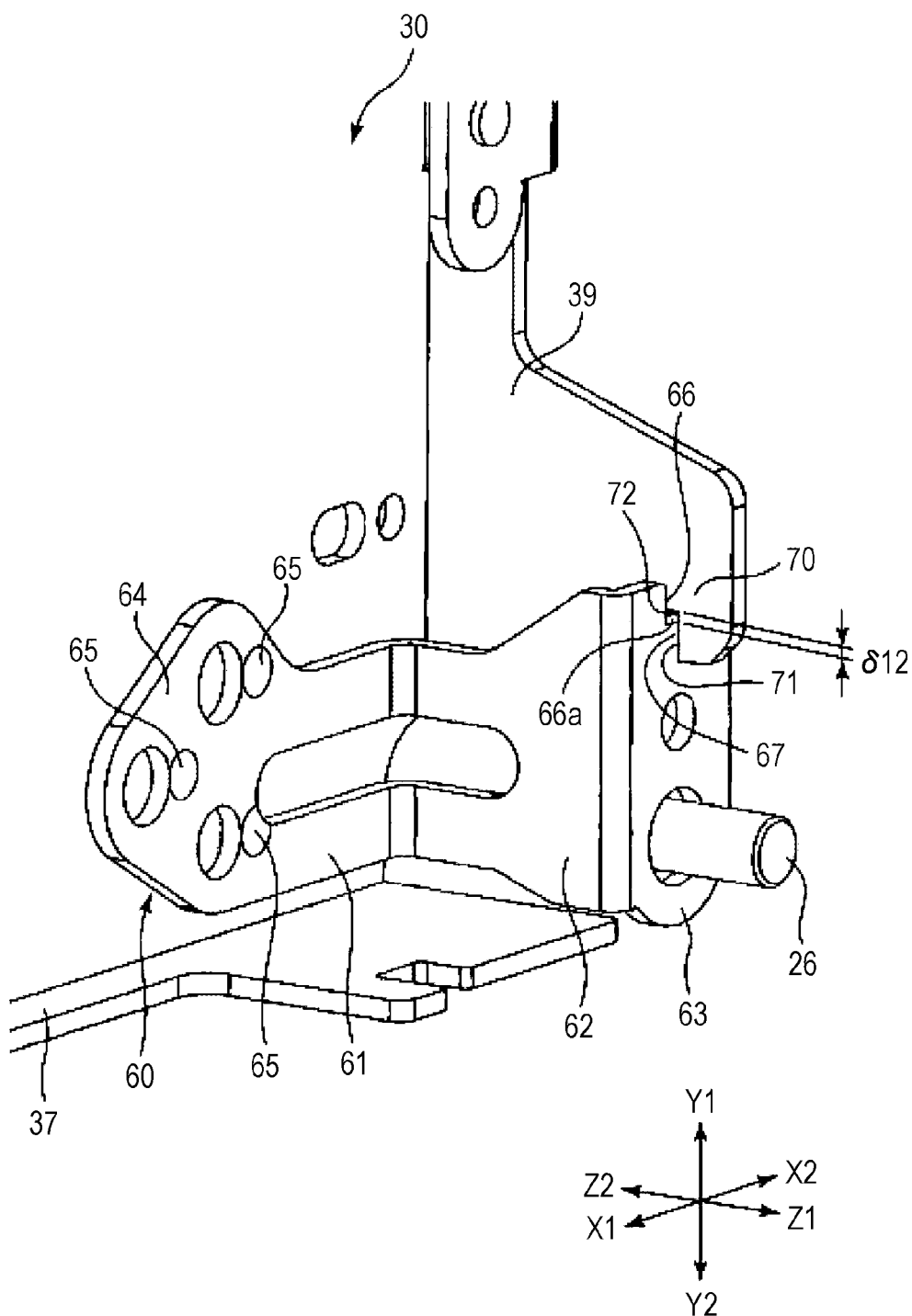
FIG. 10 is a partial perspective view of a support member, a coupling support portion, and a restriction portion as viewed from the front side (X direction in FIG. 9)
Figure 11:
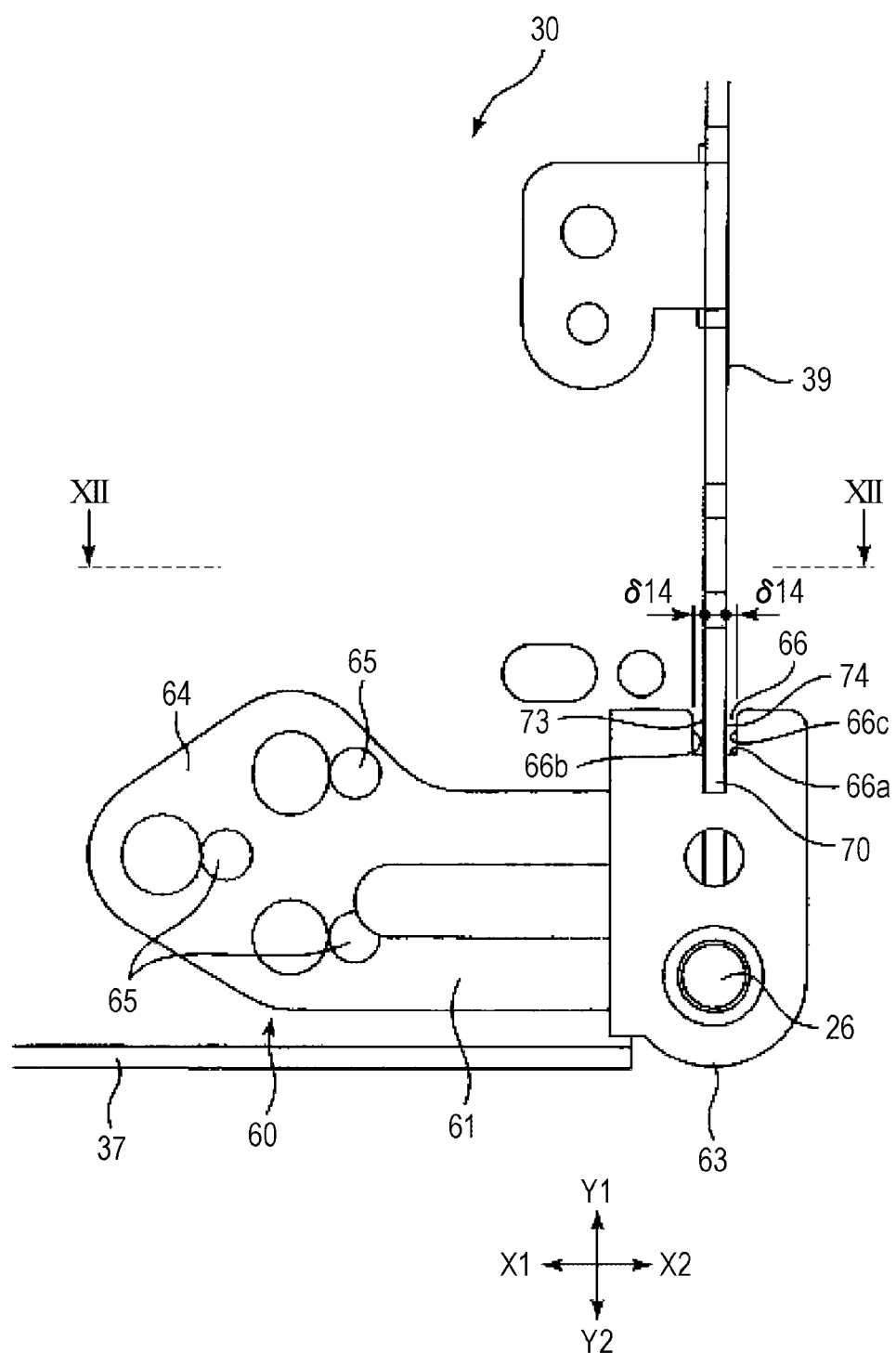
FIG. 11 is a partial front view of the support member, the coupling support portion, and the restriction portion as viewed from the front side (X direction in FIG. 9)

FIG. 8 is an enlarged view of the VIII part in FIG. 7, and a structure of the unit coupling portion 131 on the right lower side is illustrated. In FIG. 10 and FIG. 11, a structure of the support member 30 as viewed from the side (X side in FIG. 9) of the unit chassis 11 in the unit coupling portion 131 is illustrated. In the unit coupling portion 131, a coupling support portion 60 is fixed to the inner side of the support member 30 directed to the near side (Z1 side). The coupling support portion 60 is formed of a metal plate that is superior to the support member 30 in spring characteristics. In other words, a material in which the yield stress in a bending direction is large, the elastic region is wide, the ductility is excellent, and the elastic modulus is high compared with a metal plate material that constitutes the support member 30 is used as the metal plate material that constitutes the coupling support portion 60.

Figure 12:
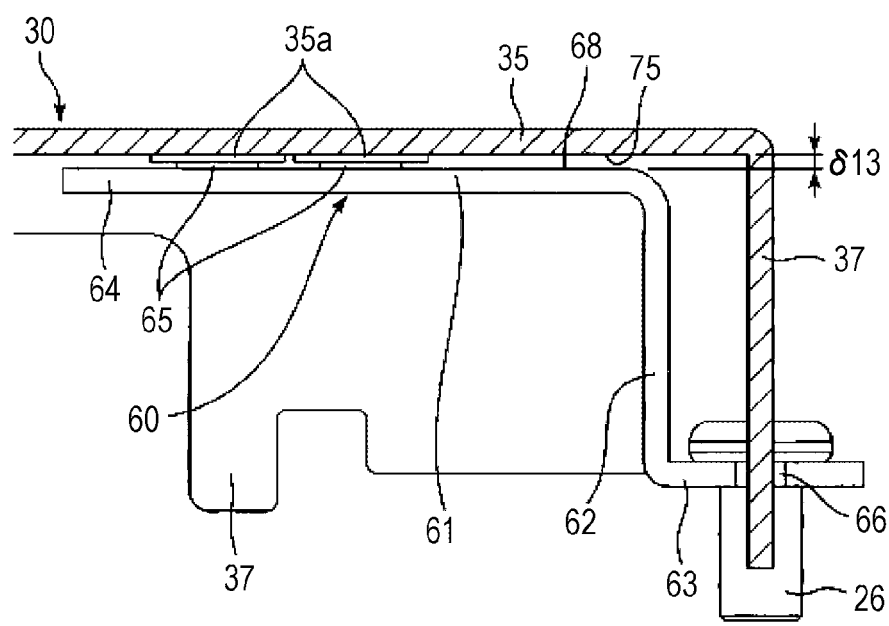
FIG. 12 is an enlarged sectional view taken along line XII-XII from the partial front view illustrated in FIG. 11.

FIG. 12 is a sectional view taken along line XII-XII from FIG. 11. As illustrated in FIG. 8 and FIG. 12, bulge portions 35a projecting toward the near side (Z1 side) are press formed at three locations on the rear plate portion 35 of the support member 30 in the unit coupling portion 131. As illustrated in FIG. 10, the end portion of the coupling support portion 60 on the left side (X1 side) serves as a base fixing piece 64. The base fixing piece 64 is disposed on the bulge portions 35a. Three portions of the base fixing pieces 64 and the bulge portions 35a are fixed to each other at a spot welding portion 65. The base fixing piece 64 and the bulge portions 35a may be fixed to each other by a caulk portion, instead of the spot welding portion 65.

As illustrated in FIG. 10, the coupling support portion 60 includes a first elastic deformation portion 61, a second elastic deformation portion 62, and a fixing piece 63 that are integral with the base fixing piece 64. The first elastic deformation portion 61 is parallel to the X-Y plane and extends in the right direction (X2 direction). The second elastic deformation portion 62 is bent at a right angle from the first elastic deformation portion 61 toward the near side (Z1 side), is parallel to the Y-Z plane, and extends toward the near side (Z1 side). The fixing piece 63 is bent at a right angle from a tip portion of the second elastic deformation portion 62 toward the right direction (X2 direction).

The coupling support portion 60 is also fixed and provided at the support member 30 in each of the unit coupling portion 132 on the left lower side, the unit coupling portion 133 on the right upper side, and the unit coupling portion 134 on the left upper side illustrated in FIG. 7. The fixing piece 63 of the unit coupling portion 131 is fixed to the unit chassis 11 by the fixing screw 26, and the fixing piece 63 of the unit coupling portion 132 is fixed to the unit chassis 11 by the fixing screw 27. The fixing piece 63 of the unit coupling portion 133 is fixed to the unit chassis 11 by the fixing screw 28, and the fixing piece 63 of the unit coupling portion 134 is fixed to the unit chassis 11 by the fixing screw 29.

As illustrated in FIG. 8, in the unit coupling portion 131 on the right lower side, a portion on the lower side (Y2 direction) of the right plate portion 39 of the support member 30 serves as a restriction piece 70. As illustrated in FIG. 9, a front restriction portion 71 directed to the rear side (Z2 direction) and an upper restriction portion 72 directed to the lower side (Y2 direction) are formed in the restriction piece 70. The front restriction portion 71 and the upper restriction portion 72 are edge surfaces of the restriction piece 70. The front restriction portion 71 and the upper restriction portion 72 are continuous to each other and form a right angle therebetween. In FIG. 11, the support member 30 in the unit coupling portion 131 is illustrated from the X direction indicated in FIG. 9. The surface of the restriction piece 70 directed to the left direction (X1 direction) serves as a right restriction portion 73, and the surface thereof directed to the right direction (X2 direction) serves as a left restriction portion 74.

As illustrated in FIG. 8, FIG. 10, and FIG. 11, a rectangular contact recess portion 66 opening upward (Y1 direction) is formed at the fixing piece 63 provided at the coupling support portion 60. As illustrated in FIG. 9 and FIG. 10, in the surface of the fixing piece 63 directed to the near side (Z1 side), a region adjacent to the contact recess portion 66 serves as a front contact portion 67. As illustrated in FIG. 9, the front restriction portion 71 formed at the restriction piece 70 and the front contact portion 67, which is a portion of the fixing piece 63, face each other to be spaced apart by a distance δ11 in the front-rear direction (Z1-Z2 direction). As illustrated in FIG. 9 and FIG. 10, the bottom side of the contact recess portion 66 on the lower side (Y2 side) serves as an upper contact portion 66a directed to the upper side (Y1 direction). A portion of the restriction piece 70 provided at the right plate portion 39 is inserted into the inner portion of the contact recess portion 66. As illustrated in FIG. 9 and FIG. 10, the upper restriction portion 72 formed at the restriction piece 70 and the upper contact portion 66a formed at the contact recess portion 66 face each other to be spaced apart by a distance δ12 in the up-down direction (Y1-Y2 direction).

As illustrated in FIG. 11, the inner side of the contact recess portion 66 on the left side (X1 side) serves as a right contact portion 66b directed to the right direction (X2 direction), and the inner side thereof on the right side (X2 side) serves as a left contact portion 66c directed to the left direction (X1 direction). The right restriction portion 73, which is a surface of the restriction piece 70, and the right contact portion 66b face each other to be spaced apart by a distance δ14 in the left-right direction (X1-X2 direction), and the left restriction portion 74 and the left contact portion 66c face each other to be spaced apart by the distance δ14 in the left-right direction (X1-X2 direction).

As illustrated in FIG. 12, the base fixing piece 64 of the coupling support portion 60 is disposed and fixed on the bulge portions 35a formed at the inner surface of the rear plate portion 35 of the support member 30. The surface of the first elastic deformation portion 61 of the coupling support portion 60 directed to the rear side (Z2 direction) serves as a rear contact portion 68. In the inner surface of the rear plate portion 35, a region facing the first elastic deformation portion 61 serves as a rear restriction portion 75. The rear restriction portion 75 and the rear contact portion 68 face each other to be spaced apart by a distance δ13 in the front-rear direction.

As illustrated in FIG. 7, between the coupling support portion 60 and the support member 30, the front restriction portion 71 and the front contact portion 67 face each other to be spaced apart by the distance δ11 similarly to those in FIG. 9, and the rear restriction portion 75 and the rear contact portion 68 face each other to be spaced apart by the distance δ13 similarly to those in FIG. 12 also in each of the unit coupling portions 132, 133, and 134 in the operation apparatus 101. Similarly to those in FIG. 11, the right restriction portion 73 and the right contact portion 66b face each other to be spaced apart by the distance δ14, and the left restriction portion 74 and the left contact portion 66c face each other to be spaced apart by the distance δ14.

The unit coupling portion 131 on the right lower side and the unit coupling portion 132 on the left lower side are spaced away from each other in the left-right direction (X1-X2 direction) and have structures that are line symmetrical about an imaginary center line extending in the up-down direction. The unit coupling portion 131 on the right lower side and the unit coupling portion 133 on the right upper side are spaced away from each other in the up-down direction (Y1-Y2 direction) and have structures that are line symmetrical about an imaginary center line extending in the left-right direction. Similarly, the unit coupling portion 132 on the left lower side and the unit coupling portion 134 on the left upper side are spaced away from each other in the up-down direction and have structures that are line symmetrical. In each of the unit coupling portions 131 and 132 on the lower side, as illustrated in FIG. 9, the upper restriction portion 72 and the upper contact portion 66a face each other to be spaced apart by the distance δ12. In each of the unit coupling portions 133 and 134 on the upper side, the structures in FIG. 9 are up-down reversed, the upper restriction portion 72 serves as a lower restriction portion directed to the upper side, and the upper contact portion 66a serves as a lower contact portion directed to the lower side.

In each of the unit coupling portions 131, 132, 133, and 134 according to the second embodiment, the contact recess portion 66 is formed at the fixing piece 63 of the coupling support portion 60, and the restriction piece 70, which is a portion of the support member 30, is inserted into the inner portion of the contact recess portion 66 to be spaced apart therefrom by the distances δ12 and δ14. On the other hand, a restriction recess portion may be formed at the right plate portion 39 of the support member 30, a portion of the fixing piece 63 of the coupling support portion 60 may serve as a contact piece, and the contact piece may be inserted into the inner portion of the restriction recess portion to be spaced apart therefrom by the distances δ12 and δ14.

Operation in Second Embodiment

Also in the operation apparatus 101 according to the second embodiment, when a hand is placed close to the operation surface 3a, which is a display screen of the operation unit 10, or a finger touches the operation surface 3a, this is detected by the operation detector 5 provided at the display unit 3, and an operation with a display image being viewed is performed. When the operation unit 10 is pressed by the finger touching the operation surface 3a, the first elastic deformation portion 61 of the coupling support portion 60 coupled to the operation unit 10 is bent and deformed, and the operation unit 10 moves toward the rear side (Z2 direction). When the pressure detector 15 detects that the operation unit 10 is moved in the Z2 direction within the range of the facing distance δ13 between the rear restriction portion 75 and the rear contact portion 68 illustrated in FIG. 12, it is determined that a pressing operation has been performed by a controller (not illustrated).

When it is determined that a pressing operation has been performed, the response force application mechanisms 20 mounted on the operation unit 10 are operated, and a response force in the left-right direction is applied to the operation unit 10. The second elastic deformation portion 62 of the coupling support portion 60 is deformed, the operation unit 10 vibrates in the left-right direction within the ranges of the facing distance δ14 between the right restriction portion 73 and the right contact portion 66b and the facing distance δ14 between the left restriction portion 74 and the left contact portion 66c illustrated in FIG. 11, and the response force can be felt by the finger touching the operation surface 3a. In the second embodiment, the elastic modulus of the coupling support portion 60 in deformation in the left-right direction (X1-X2 direction) is smaller than the elastic modulus thereof in deformation in the up-down direction (Y1-Y2 direction). The elastic modulus thereof in deformation in the front-rear direction (Z1-Z2 direction) is larger than the elastic modulus thereof in deformation in the left-right direction.

When a large force toward the near direction (Z1 direction), that is, a large force in a direction away from the support member 30 acts on the operation unit 10 as a result of, for example, the operation unit 10 being pulled toward the near direction by a hand, the front contact portion 67, illustrated in FIG. 9, that moves toward the rear side together with the operation unit 10 comes into contact with the front restriction portion 71 in each of the unit coupling portions 131, 132, 133, and 134 at four locations, and a further movement of the operation unit 10 is restricted. When a large force toward the rear side (Z2 direction) acts on the operation unit 10, the rear contact portion 68, illustrated in FIG. 12, comes into contact with the rear restriction portion 75, and the movement of the operation unit 10 toward the rear side is restricted.

When a large force in the left-right direction acts on the operation unit 10, the right contact portion 66b, illustrated in FIG. 11, comes into contact with the right restriction portion 73, or the left contact portion 66c comes into contact with the left restriction portion 74, and the movement of the operation unit 10 is restricted. When a large force in the up direction (Y1 direction) acts on the operation unit 10, the upper contact portion 66a, illustrated in FIG. 9, comes into contact with the upper restriction portion 72 in each of the unit coupling portions 131 and 132 on the lower side, and the movement of the operation unit 10 is restricted. When a large force in the down direction (Y2 direction) acts on the operation unit 10, the lower contact portion symmetrical to the upper contact portion 66a comes into contact with the lower restriction portion symmetrical to the upper restriction portion 72 in each of the unit coupling portions 133 and 134 on the upper side, and the downward movement of the operation unit 10 is restricted. The aforementioned restriction can suppress the coupling support portion 60 from being plastically deformed.

In the operation apparatus 101 according to the second embodiment, the coupling support portion 60 having excellent spring characteristics is fixed to the support member 30, and a contact portion formed at the coupling support portion 60 and a restriction portion formed at the support member 30 face each other to be spaced apart by a distance in a plurality of directions in each of the unit coupling portions 131, 132, 133, and 134. It is thus not necessary, when fixing the operation unit 10 to the support member 30, to fix a separate member constituting a restriction portion to the unit chassis 11 or the like while determining a mutual position with respect to the support member 30. It is thus possible to reduce the number of components and reduce the number of assembly steps.

In the second embodiment, restriction in three directions, including restriction of a movement in the front-rear direction, restriction of a movement in the left-right direction, and restriction of a movement in the up-down direction, can be performed between the support member 30 and the coupling support portion 60 fixed to the support member 30. In addition, by fixing the coupling support portion 60 and the support member 30 to each other, it is possible to set the distances δ11, δ12, δ13, and δ14 between a restriction portion and a contact portion in each direction with high precision. In particular, by inserting a restriction portion, which is a portion of the support member 30, into the contact recess portion 66 formed at the coupling support portion 60 or, alternatively, by inserting a contact portion formed at the coupling support portion 60 into the restriction recess portion formed at the support member 30, it is possible to cause the contact portion and the restriction portion to face each other with a uniform distance in a plurality of directions.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An operation apparatus comprising:
an operation unit including an operation detector;
a support member that supports the operation unit; and
a response force application mechanism configured to apply a response force to the operation unit,
wherein the support member comprises a coupling support portion including an elastic deformation portion, and the operation unit is supported by the support member by being fixed to the coupling support portion, and
wherein the support member comprises a restriction portion facing the coupling support portion with a gap interposed therebetween, and the coupling support portion is configured to restrict a movement of the operation unit by coming into contact with the restriction portion when the elastic deformation portion is deformed in response to an external force acting on the operation unit.

2. The operation apparatus according to claim 1, wherein the support member is formed of a metal plate, and the coupling support portion is a portion of the support member.

3. The operation apparatus according to claim 1, wherein the coupling support portion is formed of a metal plate to be a separate body from the support member, and the coupling support portion is fixed to the support member.

4. The operation apparatus according to claim 3, wherein the coupling support portion is fixed to the support member to be spaced apart by a distance, and a portion of the support member facing the coupling support portion serves as the restriction portion.

5. The operation apparatus according to claim 1, wherein the coupling support portion is configured to restrict a movement of the operation unit in a direction away from the support member by coming into contact with the restriction portion.

6. The operation apparatus according to claim 1, wherein the restriction portion comprises a plurality of restriction portions, the plurality of restriction portions and the coupling support portion facing each other in a plurality of different directions, and the coupling support portion and the plurality of restriction portions are configured to restrict both of a movement of the operation unit in a direction away from the support member and a movement of the operation unit in directions other than the direction away from the support member by coming into contact with each other.

7. The operation apparatus according to claim 6, wherein a recess portion is formed at one of the support member and the coupling support portion, and another one of the support member and the coupling support portion is positioned at an inner portion of the recess portion, thereby constituting the plurality of restriction portions.

8. The operation apparatus according to claim 1, wherein the response force application mechanism is configured to apply a response force to the operation unit, and wherein an elastic modulus of the elastic deformation portion in deformation in a first direction in which the response force acts thereon is smaller than an elastic modulus thereof in deformation in a direction orthogonal to the first direction.

9. The operation apparatus according to claim 8, further comprising:

a pressure detector configured to detect that the operation unit is pressed toward the support member, wherein an elastic modulus of the elastic deformation portion in deformation in a direction along a pressed direction is larger than an elastic modulus thereof in deformation in an application direction of a response force.

10. An operation apparatus comprising:

an operation unit including an operation detector; and a support member that supports the operation unit;

wherein the support member comprises a coupling support portion including an elastic deformation portion, and the operation unit is supported by the support member by being fixed to the coupling support portion, and wherein the support member comprises a restriction portion facing the coupling support portion with a gap interposed therebetween, and the coupling support portion is configured to restrict a movement of the operation unit by coming into contact with the restriction portion when the elastic deformation portion is deformed in response to an external force acting on the operation unit.

11. The operation apparatus according to claim 10, wherein the support member is formed of a metal plate, and the coupling support portion is a portion of the support member.

12. The operation apparatus according to claim 10, wherein the coupling support portion is formed of a metal plate to be a separate body from the support member, and the coupling support portion is fixed to the support member.

13. The operation apparatus according to claim 12, wherein the coupling support portion is fixed to the support member to be spaced apart by a distance, and a portion of the support member facing the coupling support portion serves as the restriction portion.

14. The operation apparatus according to claim 10, wherein the coupling support portion is configured to restrict a movement of the operation unit in a direction away from the support member by coming into contact with the restriction portion.

15. The operation apparatus according to claim 10, wherein the restriction portion comprises a plurality of restriction portions, the plurality of restriction portions and the coupling support portion facing each other in a plurality of different directions, and the coupling support portion and the plurality of restriction portions are configured to restrict both of a movement of the operation unit in a direction away from the support member and a movement of the operation unit in directions other than the direction away from the support member by coming into contact with each other.

16. The operation apparatus according to claim 15, wherein a recess portion is formed at one of the support member and the coupling support portion, and another one of the support member and the coupling support portion is positioned at an inner portion of the recess portion, thereby constituting the plurality of restriction portions.

17. The operation apparatus according to claim 10, wherein an elastic modulus of the elastic deformation portion in deformation in a first direction is smaller than an elastic modulus thereof in deformation in a direction orthogonal to the first direction.

18. The operation apparatus according to claim 17, further comprising:

a pressure detector configured to detect that the operation unit is pressed toward the support member, wherein an elastic modulus of the elastic deformation portion in deformation in a direction along a pressed direction is larger than an elastic modulus thereof in deformation in a direction orthogonal to the pressed direction.

19. An on-vehicle operation apparatus comprising:

an operation unit including a touch panel;

a support member that supports the operation unit; and a response force application mechanism configured to apply a response force to the touch panel, wherein the support member comprises a coupling support portion including an elastic portion, and the operation unit is supported by the support member by being fixed to the coupling support portion, and wherein the support member comprises a restriction portion facing the coupling support portion with a gap interposed therebetween, and the coupling support portion is configured to restrict a movement of the operation unit by coming into contact with the restriction portion when the elastic portion is deformed in response to an external force acting on the operation unit.

* * * * *